US007463936B2

(12) United States Patent
Baumann et al.

(10) Patent No.: US 7,463,936 B2
(45) Date of Patent: Dec. 9, 2008

(54) METHOD AND DEVICE FOR ADAPTING A STOP OF AN ELECTRICALLY TRIGGERED ACTUATOR

(75) Inventors: Torsten Baumann, Eppingen-Adelshofen (DE); Mattias Hallor, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 448 days.

(21) Appl. No.: 11/262,541

(22) Filed: Oct. 28, 2005

(65) Prior Publication Data

US 2006/0106467 A1 May 18, 2006

(30) Foreign Application Priority Data

Nov. 4, 2004 (DE) ...................... 10 2004 053 265

(51) Int. Cl.
*G05B 13/02* (2006.01)
*G05B 11/01* (2006.01)
*F02D 41/00* (2006.01)

(52) U.S. Cl. ............................ 700/28; 700/13; 700/47; 123/339.14; 318/466; 318/468

(58) Field of Classification Search .................. 700/13, 700/28, 56, 47, 33, 57; 123/399.14, 339.15, 123/339.24; 318/264–266, 468, 466
See application file for complete search history.

(56) References Cited

U.S. PATENT DOCUMENTS

| | | | | |
|---|---|---|---|---|
| 5,033,431 | A * | 7/1991 | Poirier et al. | 123/339.24 |
| 5,046,467 | A * | 9/1991 | Arnold et al. | 123/339.15 |
| 5,429,088 | A * | 7/1995 | Lang et al. | 123/339.14 |
| 6,828,747 | B2 * | 12/2004 | Endo et al. | 318/560 |
| 7,194,319 | B2 * | 3/2007 | Grossmann et al. | 700/33 |

* cited by examiner

*Primary Examiner*—Albert DeCady
*Assistant Examiner*—Steven R Garland
(74) *Attorney, Agent, or Firm*—Kenyon & Kenyon LLP

(57) ABSTRACT

A method and device for adapting a stop of an electrically triggered actuator are provided, which may be implemented in a precise and simple manner and allow for a continuous adaptation. For this purpose, a check is performed to determine whether a setpoint value for a position of the actuator to be set corresponds to a stop of the actuator. In this case, a characteristic variable of the trigger signal for triggering the actuator formed for implementing the setpoint value is compared with a predefined value. Depending on the result of the comparison, a position of the stop of the actuator is adapted.

17 Claims, 1 Drawing Sheet

METHOD AND DEVICE FOR ADAPTING A STOP OF AN ELECTRICALLY TRIGGERED ACTUATOR

FIELD OF THE INVENTION

The present invention relates to a method and a device for adapting a stop of an electrically triggered actuator.

BACKGROUND INFORMATION

For electrically triggered actuators such as, for example, throttle valves, charge movement valves, exhaust-gas recirculation valves, bypass valves for compressors, etc. in a motor vehicle, a digital control system in an engine control unit is often used for controlling their triggering. To ensure a precise control of the air flow rate in the region of a lower stop of the actuator, the position of the lower stop must be know with great precision. This position of the lower stop is often adapted in order to ascertain the value of the position of the lower stop representative of the particular actuator. Since the stop position may change during operations on account of temperature changes and contaminations, a continuous re-adaptation is sometimes desirable. If the stop position is not known with sufficient precision or if, in the case of the lower stop for example, it drifts upward due to temperature changes or contaminations, then there is the danger that the stop is constantly encountered too quickly.

SUMMARY

A method and device according to an example embodiment of the present invention for adapting a stop of an electronically triggered actuator may have an advantage that a check is performed as to whether a setpoint value for a position of the actuator to be set corresponds to a stop of the actuator. In this case, a characteristic variable of the trigger signal formed for implementing the setpoint value for triggering the actuator is compared with a predefined value. A position of the stop of the actuator is adapted as a function of the result of the comparison. In this manner it is possible to continuously adapt the position of the stop of the actuator, also called the stop position in the following, in order to ensure a more precise control of the flow rate of a medium at all temperatures and contaminations. This may also prevent the stop from constantly being encountered too quickly due to the fact that the stop position is not known with sufficient precision.

It may be particularly advantageous if, for adapting the position of the stop of the actuator, a condition for comparing the characteristic variable of a trigger signal with the predefined value must be fulfilled at least for a predefined time. In this manner it can be prevented that the position of the stop of the actuator is adapted or adjusted merely on account of a temporary interference or on account of fluctuations of the trigger signal due to a control system and is thus adapted or adjusted unnecessarily.

A further advantage may result if a pulse control factor is selected as the characteristic variable of the trigger signal. This may be ascertained in a simple manner and, in the case of a pulse-width modulated trigger signal, is the variable for triggering the actuator. Thus, the adaptation of the position of the stop of the actuator is implemented as precisely as possible.

Another advantage may be obtained if, in performing the check as to whether the setpoint value for the position of the actuator to be set corresponds to a stop of the actuator, the setpoint is compared to a threshold value near the stop and then, if the setpoint value lies between the threshold value and the stop, it is determined that the setpoint value for the position of the actuator to be set corresponds to the stop of the actuator. With a suitable choice of threshold value, this represents a particularly simple and reliable procedure for checking whether the setpoint value for the position of the actuator to be set corresponds to the stop of the actuator.

For this purpose, it may be especially advantageous if a first threshold value for an adaptation of the stop in the sense of raising the position of the stop and a second threshold value for an adaptation of the stop in the sense of lowering the position of the stop of the actuator are predefined. In this manner, the position of the actuator may be continuously adapted in two directions. Thus, it is possible, for example, to compensate for an incorrect adaptation of the position of the actuator in the one direction by an adaptation of the position of the actuator in the opposite direction. Since it is possible that the adaptation of the stop position occurs at another, particularly a higher, temperature than the temperature at which the actuator is normally operated, it may be especially important for the precision of the adaptation if the continuous adaptation is able to act in both directions, that is, in two opposite directions. With a suitable selection of the two threshold values, the described features allow for the change of the stop position in both directions to be correctly identified and, thus, for a learning value for the position of the stop of the actuator to be adapted or adjusted accordingly.

This may be accomplished in a particularly simple and reliable manner by selecting the first threshold value to be greater than the second threshold value.

Another advantage may be obtained, for example, by changing a learning value for the position of the stop if the characteristic variable of the trigger signal, particularly for at least a predefined time, exceeds a predefined value. Thus, it is possible to change the learning value for the position of the stop, i.e., adjust it to the actual position of the stop, in a simple and reliable manner.

This may be achieved in a particularly simple way for the two directions in that the learning value for the position of the stop is increased if the characteristic variable of the trigger signal exceeds, particularly for at least a first predefined time, a first predefined value in a first direction or in that a learning value for the position of the stop is lowered if the characteristic variable of the trigger signal exceeds, particularly for at least a second predefined time, a second predefined value in a second direction.

For achieving a hysteresis and for preventing a constant alternation between raising and lowering the learning value for the position of the stop, it may be advantageous to select the first predefined value to be greater than the second predefined value.

It if furthermore advantageous if the adaptation of the position of the stop of the actuator is restricted. Thus, it is possible to prevent a compensation for a malfunction of the actuator by adapting the position of the stop of the actuator.

BRIEF DESCRIPTION OF THE DRAWINGS

An exemplary embodiment of the present invention is shown in the figures and explained in detail below.

DETAILED DESCRIPTION OF EXAMPLE EMBODIMENTS

Figure 1:
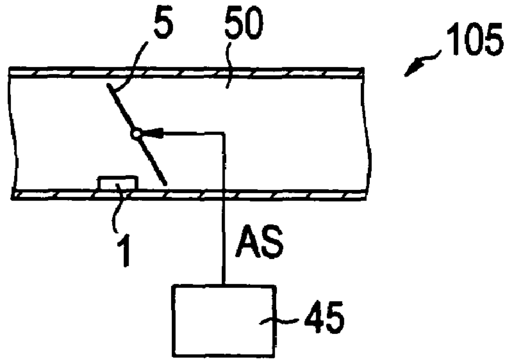
FIG. 1 shows a schematic view of an electrically triggered actuator.

In FIG. 1, 105 indicates a rough schematic detail of an internal combustion engine. The internal combustion engine may take the form of a spark-ignition engine or a diesel engine, for example, and drives a vehicle for example. In this context, an air inlet 50 of the internal combustion engine houses an actuator 5, for example a throttle valve, which is electrically triggered by a control unit 45 of the internal combustion engine. This triggering may occur for example as a function of a driver input in a conventional manner. Furthermore, FIG. 1 shows a lower stop 1 of throttle valve 5. Throttle valve 5 may move toward this lower stop 1 to interrupt the air supply to the internal combustion engine. In FIG. 1, the trigger signal for throttle valve 5 is indicated by AS. As an electrically triggered actuator in air inlet 50 of the internal combustion engine, throttle valve 5 is cited here only by way of example. In principle, the example method of the present invention described below and the example device of the present invention described below may be used in a corresponding fashion for any electrically triggered actuator. In this context, the actuator may be used to vary the flow rate of any medium in any channel, the use of actuator 5 also not being limited to an internal combustion engine.

According to an example embodiment of the present invention, a check is provided to determine whether a setpoint value for a position of actuator 5 to be set corresponds to a stop of actuator 5. In the present example, the check determines whether the setpoint value for the position of actuator 5 to be set corresponds to lower stop 1 of actuator 5 according to FIG. 1. If this is the case, then a characteristic variable of the trigger signal AS for triggering actuator 5 formed for implementing the setpoint value is compared with a predefined value. Depending on the result of the comparison, the position of lower stop 1 of actuator 5 is then adapted or adjusted. If trigger signal AS is a pulse-width modulated signal, then a pulse control factor of trigger signal AS may be chosen, for example, as a characteristic variable of trigger signal AS.

While checking whether the setpoint value for the position of actuator 5 to be set corresponds to the lower stop 1 of actuator 5, the setpoint value may be compared with a suitably chosen threshold value near lower stop 1. For this purpose, the threshold value may be applied in a suitable manner on a test stand, for instance. If the setpoint value is between the threshold value and lower stop 1, then it is determined that the setpoint value for the position of actuator 5 to be set corresponds to lower stop 1 of actuator 5. For this purpose, the predefined threshold value may be applied on a test stand in such a way, for example, that it lies on the one hand as close as possible to lower stop 1 so as to ensure that a setpoint value for the position of actuator 5 to be set located on the side of the threshold value facing lower stop 1 indeed has the goal of having actuator 5 encounter stop 1. On the other hand, the threshold value should also be at a sufficient distance from stop 1 to allow space for an adaptation of the position of stop 1.

To allow for an adaptation of the position of stop 1 in two directions, particularly in two opposite directions, it is optionally provided to predefine a first threshold value for an adaptation of stop 1 in the sense of raising the position of stop 1 and a second threshold value for an adaptation of stop 1 in the sense of lowering the position of stop 1 of actuator 5. For this purpose, the first threshold value may advantageously be selected to be greater than the second threshold value in order to be able to distinguish the direction of the required adaptation of the position of stop 1 in a reliable manner.

The comparison of the characteristic variable of trigger signal AS, which in this example takes the form of a pulse control factor of trigger signal AS, with a predefined value may be performed, for example, by checking whether the comparison or whether the result of the comparison fulfills a predefined condition. If this is the case, then the position of stop 1 of actuator 5 is adapted or adjusted, while otherwise there will be no adaptation of the position of stop 1 of actuator 5. The condition for the comparison is chosen in such a way, for example, that the characteristic variable of the trigger signal, in this example the pulse control factor of trigger signal AS, must exceed the predefined value so that a learning value for the position of stop 1 is changed and the position of stop 1 is thereby adapted. If the characteristic variable of the trigger signal falls below the predefined value, then there is no change of the learning value for the position of the stop and thus no adaptation of the position of stop 1.

To ensure that the predefined condition for the comparison of the characteristic variable of trigger signal AS with the predefined value is satisfied not only in the short term, for example due to the position of the actuator being automatically controlled to the predefined setpoint value or due to malfunctions, without requiring an adjustment of the position of stop 1 of actuator 5, a check is provided optionally and in an advantageous manner to determine whether the condition for comparing the characteristic variable of trigger signal AS with the predefined value is fulfilled at least for a predefined time. The position of stop 1 of actuator 5 is adapted only in this case, otherwise, that is, if the condition is fulfilled for less than the predefined time period, there is no adaptation of the position of stop 1. Thus, the learning value for the position of stop 1 is changed only when the characteristic variable of the trigger signal exceeds the predefined value for at least the predefined time period. For this purpose, the predefined time may be applied in a suitable manner on a test stand, for instance. In this instance, the predefined time may be chosen in such a way that short-term malfunctions or deviations of trigger signal AS may be distinguished reliably from the requirement for the adaptation of the position of stop 1 of actuator 5.

In the event of an adaptation of the position of stop 1 of actuator 5 in two, in particular opposite directions, the learning value for the position of stop 1 will, thus, be raised if the characteristic variable of trigger signal AS exceeds, in particular for at least a first predefined time period, a first predefined value in a first direction. Accordingly, the learning value for the position of stop 1 is lowered if the characteristic variable of trigger signal AS, in particular for at least a second predefined time, exceeds a second predefined value in a second direction. The first predefined time and the second predefined time may be chosen to be of equal duration, for example, and may be suitably applied on a test stand in the above-described manner. The first predefined value may optionally be selected to be higher than the second predefined value in order to achieve a hysteresis and to prevent a constantly alternating raising and lowering of the learning value for the position of stop 1 of actuator 5. Exceeding the first predefined value in a first direction may be understood as the actual exceeding of the first predefined value, and exceeding the second predefined value in a second direction may be understood as the actual undershooting of the second predefined value. In this manner, the adaptation of the position of stop 1 of actuator 5 may be implemented in two opposite directions. Due to the described hysteresis, a particularly reliable differentiation of the two opposite adaptation directions is possible, and additionally, as described, a constantly alternating raising and lowering of the learning value for the position of stop 1 of actuator 5 is prevented, in that a sufficiently applied distance between the two predefined values ensures that the pulse control factor under constant conditions, particularly with respect to temperature and degree of contamination of the actuator, is reproducibly able to oscillate within the two predefined values if actuator 5 is at stop 1.

Finally, there may be an optional provision to restrict the adaptation of the position of stop 1 of actuator 5 in a suitable manner in order to prevent a malfunction of actuator 5 from being compensated by the adaptation of the position of stop 1.

Figure 2:
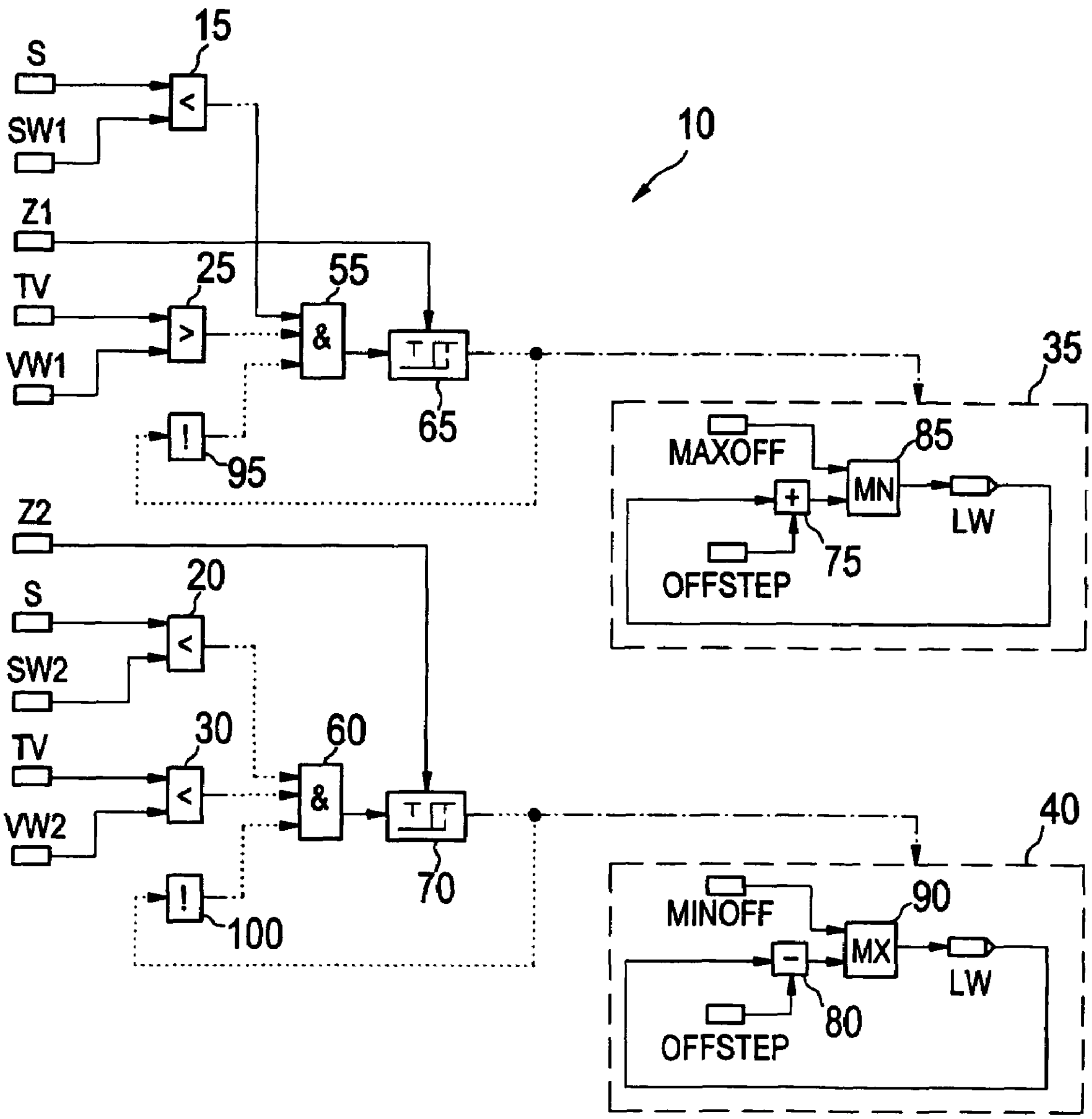
FIG. 2 shows a flow chart for explaining an example the method according to the present invention and an example device according to the present invention.

FIG. 2 shows a flow chart describing an exemplary construction of an example device according to an example embodiment of the present invention and an exemplary sequence of the method according to the present invention. The flow chart is indicated in FIG. 2 by the reference numeral 10 and may be implemented for example in terms of software and/or hardware in control unit 45. The adaptation of lower stop 1 of throttle valve 5 is described in an exemplary manner with the aid of the flow chart shown in FIG. 2. For setting the position of throttle valve 5, control unit 45 specifies a setpoint value S, for example as a function of a driver input, which is supplied both to a first comparison element 15 and to a second comparison element 20 of flow chart 10. In the process, the previously described first threshold value indicated by SW1 in FIG. 1 is also supplied to first comparison element 15. In addition, the previously described second threshold value indicated by SW2 in FIG. 2 is supplied to second comparison element. As described, first threshold value SW1 is chosen to be greater than second threshold value SW2, and both threshold values SW1, SW2 were suitably applied in the previously described manner on a test stand for example. If setpoint value S is smaller than first threshold value SW1, then the output of first comparison element 15 is set. If setpoint value S is smaller than second threshold value SW2, then the output of second comparison element 20 is set. The output of first comparison element 15 is supplied to an input of a first AND gate 55. The output of second comparison element 20 is supplied to an input of a second AND gate 60. Since control unit 45 specifies trigger signal AS for setting a desired position of throttle valve 5, the pulse control factor is known in control unit 45 as a characteristic variable of trigger signal AS and is indicated by TV in the flow chart shown in FIG. 2. Pulse control factor TV is supplied to a third comparison element 25 and to a fourth comparison element 30. In addition, the previously described first predefined value indicated by VW1 in FIG. 2 is supplied to third comparison element 25. Furthermore, the previously described second predefined value indicated by VW2 in FIG. 2 is supplied to fourth comparison element 30. For this purpose, as described, first predefined value VW1 is chosen to be greater than second predefined value VW2, it being possible to apply the distance between first predefined value VW1 and second predefined value VW2 suitably on a test stand, for example, in such a way that under constant conditions for the operation of throttle valve 5, in the present example under constant operating conditions of the internal combustion engine, the learning value for the position of lower stop 1 of throttle valve 5 remains constant, i.e., does not have to be changed and, thus, also does not alternate between being raised and lowered. In this case, the pulse control factor TV lies between first predefined value VW1 and second predefined value VW2.

In the event that pulse control factor TV is greater than first predefined value VW1, the output of third comparison element 25 is set. The output of third comparison element 25 is supplied to a second input of first AND gate 55. In the event that pulse control factor TV is smaller than second predefined value VW2, the output of fourth comparison element 30 is set. The output of fourth comparison element 30 is supplied to a second input of second AND gate 60. An output of first inversion element 95 is supplied to a third input of first AND gate 55. An output of second inversion element 100 is supplied to a third input of second AND gate 60. The output of first AND gate 55 is set if all of its inputs are set. The output of second AND gate 60 is set if all of its inputs are set. The output of first AND gate 55 is supplied to a first timing element 65. The output of second AND gate 60 is supplied to a second timing element 70. For first timing element 65, the previously described first predefined time is specified as a time constant, this first predefined time being indicated by Z1 in FIG. 2. For second timing element 70, the previously described second predefined time is specified as a time constant, this second predefined time being indicated by Z2 in FIG. 2. As previously described, first predefined time Z1 may for example be selected to be equal to second predefined time Z2. The two predefined times Z1, Z2 have been suitably applied, in the manner described previously, on a test stand for example. First threshold value SW1, second threshold value SW2, first predefined value VW1, second predefined value VW2, first predefined time Z1 and second predefined time Z2 may be stored for example in a memory assigned to control unit 45. First predefined value VW1 and second predefined value VW2 may for example also be suitably applied on a test stand in such a way that pulse control factor TV exceeds first predefined value VW1 only if the learned position of stop 1 of actuator 5 deviates by more than an acceptable tolerance range from the actual position of stop 1 of actuator 5 such that the position of stop 1 to higher values must be learned anew. Accordingly, second predefined value VW2 may be suitably applied for example on a test stand in such a way that pulse control factor TV falls below it only if the position of stop 1 is smaller than the learned value by more than an acceptable tolerance range.

First timer element 65 initially has an unset or reset output such that the output of first inversion element 95 is set. Accordingly, the output of second timer element 70 initially has an unset or reset output such that also the output of second inversion element 100 is initially set. If now the output of first AND gate 55 is set at least for first predefined time Z1, then a set pulse is produced in the output of first timer element 65, which on the one hand resets the output of first inversion element 95 for the duration of this set pulse, thus preventing an immediately ensuing renewed setting of first AND gate 55, and which on the other hand activates a first adaptation unit 35. For this purpose, first predefined time Z1 may be advantageously applied in such a way that sufficient time remains until the renewed setting of first AND gate 55 in order to adjust the pulse control factor to the position currently to be adapted. With the activation of first adaptation unit 35 by the set pulse on the output of first timer element 65, a currently existing learning value LW for the position of lower stop 1 of throttle valve 5 in a summing element 75 is incremented by a predefined offset value OFFSTEP and the thus incremented learning value is supplied to a minimum selection element 85 to which a maximum restriction value MAXOFF is supplied as well. Minimum selection element 85 selects the minimum of the two supplied variables MAXOFF, LW+OFFSTEP and emits it at its output as a new learning value LW for the position of lower stop 1 of throttle valve 5. A renewed incrementation of the newly formed learning value LW then only occurs with a new set pulse on the part of first timer element 65. Accordingly, a set pulse is produced at the output of second timer element 70 if for at least the second predefined time period Z2 the output of second AND gate 60 was set. For the duration of the set pulse, the output of the second inversion element is then reset such that an immediately ensuing generation of a new set pulse at the output of second timer element 70 is prevented. The set pulse at the output of second timer element 70 additionally activates a second adaptation unit 40. For this purpose, second predefined time Z2 may be advantageously applied in such a way that sufficient time remains until the renewed setting of second AND gate 60 in order to adjust the pulse control factor to the position currently to be adapted. Following the activation of second adaptation unit 40, current learning value LW is decremented in a subtraction element 80 by the predefined incremental value OFFSTEP such that the value LW-OFFSTEP is applied at the output of subtraction element 80 and is supplied to a maximum selection element 90.

The maximum selection element 90 is also supplied with a minimum restriction value MINOFF. Maximum selection element 90 selects the maximum of the values MINOFF and LW-OFFSTEP and emits the selected maximum as a new learning value LW at its output. A renewed decrementing of the learning value occurs only with a new set pulse of second timer element 70. The adaptation of learning value LW is thus restricted upward by MAXOFF and downward by MINOFF, it being possible to apply the restricting values MINOFF, MAXOFF suitably on a test stand, for example, in such a way that it may be ruled out as reliably as possible that the adaptation of the learning value compensates for a malfunction of throttle valve 5. In an alternative specific embodiment, the restriction by a minimum selection element 85 and a maximum selection element 90 may also be eliminated such that in this alternative specific embodiment malfunctions of throttle valve 5 may also be compensated for by the adaptation of the learning value for the position of lower stop 1 of throttle valve 5. Increment value OFFSTEP may also be suitably applied on a test stand, for example, in order to allow for the learning value LW to approach the actual position of lower stop 1 of throttle valve 5 as quickly as possible, while preventing on the other hand that, due to an excessively large increment value OFFSTEP, learning value LW does not reach the actual position of lower stop 1 with the desired precision.

The resetting of first AND element 55 and of second AND element 60 following a respective set pulse at the output of first timer element 65 or at the output of second timer element 70 makes it possible for a control unit of the triggering of throttle valve 5 to adjust to the new learning value LW before this is possibly raised or lowered once again.

In the applications of first threshold value SW1, the following should also be considered: First threshold value SW1 should be applied in such a way that, if pulse duty factor TV for a setpoint value S above first threshold value SW1 is greater than a further predefined value for at least a further predefined time, then throttle valve 5 is jammed or faulty rather than the actual stop position having changed. In the application of second threshold value SW2 it should be considered that this threshold value is clearly smaller than first threshold value SW1 since only in this manner is it possible to determine that, when setpoint value S falls below second threshold value SW2 and pulse control factor TV falls below second predefined value VW2, pulse control factor TV is too low to reach lower stop 1 if throttle valve 5 is indeed to reach lower stop 1. This indicates that the position of lower stop 1 in the direction of lower values should be learned.

In an entirely corresponding manner, the described method and device may also be used for learning the position of an upper stop of actuator 5, particularly of the throttle valve.

If trigger signal AS is not pulse-width modulated, then in place of the pulse control factor another characteristic variable of trigger signal AS, for example its amplitude or its effective value, may be chosen as well. The above considerations may then be applied analogously to the use of a characteristic variable of trigger signal AS selected in this manner.

Trigger signal AS is used for implementing setpoint value S by adjusting throttle valve 5 accordingly and results for example as an output variable of an automatic control implemented in control unit 45 for the position of actuator 5 as a function of the difference of setpoint value S for the position of actuator 5 to be set and an actual value for the currently set position of actuator 5 which is measured, for example, or is modeled from other operating variables particularly of the internal combustion engine. The goal of the automatic control in this instance is the minimization of the mentioned difference.

What is claimed is:

1. A method for an adaptation of a stop of an electrically triggered actuator, comprising:
- performing a check as to whether a setpoint value for a position of the actuator to be set corresponds to a stop of the actuator; and
- if it is determined in the performing the check step that the setpoint value corresponds to the stop of the actuator;
  - comparing a characteristic variable of a trigger signal for triggering the actuator with a predefined value, the characteristic variable implementing the setpoint value; and
  - if a particular result of the comparing step is obtained, modifying a learning value for a position of the stop of the actuator, the learning value for the position of the stop otherwise being maintained without change on account of the comparing step.

2. The method as recited in claim 1, wherein for adapting the position of the stop of the actuator, a condition for comparing the characteristic variable of the trigger signal with the predefined value must be fulfilled at least for a predefined time period.

3. The method as recited in claim 1 wherein:
- the performing the check step includes comparing the setpoint value with a threshold value near the stop;
- if the setpoint value is determined to lie between the threshold value and the stop, the setpoint value for the position of the actuator to be set is determined to correspond to the stop of the actuator; and otherwise
- the setpoint value for the position of the actuator to be set is determined not to correspond to the stop of the actuator.

4. The method as recited in claim 3, further comprising:
- predetermining a first threshold value for an adaptation of the stop for raising of the position of the stop; and
- predefining a second threshold value for an adaptation of the stop for a lowering of the position of the stop.

5. The method as recited in claim 4, wherein the first threshold value is greater than the second threshold value.

6. The method as recited in claim 1, wherein the modification of the learning value of the position of the stop of the actuator is restricted.

7. A method for an adaptation of a stop of an electrically triggered actuator, comprising:
- performing a check as to whether a setpoint value for a position of the actuator to be set corresponds to a stop of the actuator;
- comparing a characteristic variable of a trigger signal for triggering the actuator with a predefined value, the characteristic variable implementing the setpoint value; and adapting a position of the stop of the actuator depending on a result to the comparing step;

wherein a pulse control factor is the characteristic variable of the trigger signal.

8. A method for an adaptation of a stop of an electrically triggered actuator, comprising:

performing a check as to whether a setpoint value for a position of the actuator to be set corresponds to a stop of the actuator;

comparing a characteristic variable of a trigger signal for triggering the actuator with a predefined value, the characteristic variable implementing the setpoint value;

adapting a position of the stop of the actuator depending on a result to the comparing step; and changing a learning value for the position of the stop if the characteristic variable of the trigger signal exceeds the predefined value for at least a predetermined time period, the learning value otherwise being maintained without change on account of how the characteristic variable of the trigger signal compares with the predefined value.

9. The method as recited in claim 8, wherein the learning value for the position of the stop is raised if the characteristic variable of the trigger signal exceeds, for at least a first predefined period, a first predefined value in a first direction.

10. The method as recited in claim 9, wherein the learning value for the position of the stop is lowered if the characteristic variable of the trigger signal exceeds, for at least a second predefined time period, a second predefined value in a second direction.

11. The method as recited in claim 10, wherein the first predefined value is greater than the second predefined value.

12. A device for the adaptation of a stop of an electrically triggered actuator, comprising:

a testing arrangement configured to check whether a setpoint value for a position of the actuator to be set corresponds to a stop of the actuator;

a comparator configured to, if it is determined in the check that the setpoint value corresponds to the stop of the actuator, compare a characteristic variable of a trigger signal for triggering the actuator with a predefined value, the characteristic variable implementing the setpoint value; and an adapter configured to, if a particular result of the comparison is obtained, modify a learning value for a position of the stop of the actuator, the learning value for the position of the stop otherwise being maintained without change on account of the comparison.

13. A method for an adaptation of a stop of an electrically triggered actuator, comprising:

performing a check as to whether a setpoint value for a position of the actuator to be set corresponds to a stop of the actuator; and if it is determined in the performing the check step that the setpoint value corresponds to the stop of the actuator:

comparing a characteristic variable of a trigger signal for triggering the actuator with a predefined value, the characteristic variable implementing the setpoint value; and if that the characteristic variable of the trigger signal exceeds the predefined value for at least a predetermined time period is determined in the comparing step, changing a learning value for a position of the stop of the actuator, the learning value otherwise being maintained without change on account of the comparing step.

14. The method as recited in claim 13, wherein the learning value for the position of the stop is raised if the characteristic variable of the trigger signal exceeds, for at least a first predefined period, a first predefined value in a first direction.

15. The method as recited in claim 14, wherein the learning value for the position of the stop is lowered if the characteristic variable of the trigger signal exceeds, for at least a second predefined time period, a second predefined value in a second direction.

16. The method as recited in claim 15, wherein the first predefined value is greater than the second predefined value.

17. A method for an adaptation of a stop of an electrically triggered actuator, comprising:

performing a check as to whether a setpoint value for a position of the actuator to be set corresponds to a stop of the actuator; and if it is determined in the performing the check step that the setpoint value corresponds to the stop of the actuator:

comparing a characteristic variable of a trigger signal for triggering the actuator with a predefined value, the characteristic variable implementing the setpoint value; and if a particular result of the comparing step is obtained, modifying a learning value for a position of the stop of the actuator, the learning value for the position of the stop otherwise being maintained without change on account of the comparing step;

wherein a pulse control factor is the characteristic variable of the trigger signal.

* * * * *